(12) United States Patent
Lan et al.

(10) Patent No.: US 9,927,666 B2
(45) Date of Patent: Mar. 27, 2018

(54) LIQUID CRYSTAL DISPLAY SYSTEMS AND RELATED METHODS

(71) Applicant: a.u. Vista Inc., Milpitas, CA (US)

(72) Inventors: Yi-Fen Lan, Hsin-Chu (TW); Daming Xu, Orlando, FL (US); Cheng-Yeh Tsai, Hsin-Chu (TW); Norio Sugiura, Hsin-Chu (TW); Shin-Tson Wu, Orlando, FL (US)

(73) Assignees: a.u. Vista Inc., Milpitas, CA (US); The University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 15/133,339

(22) Filed: Apr. 20, 2016

(65) Prior Publication Data

US 2017/0307942 A1 Oct. 26, 2017

(51) Int. Cl.
*G02F 1/1343* (2006.01)

(52) U.S. Cl.
CPC .............. *G02F 1/134309* (2013.01)

(58) Field of Classification Search
CPC ................................. G02F 1/134309
See application file for complete search history.

(56) References Cited

U.S. PATENT DOCUMENTS

| | | | |
|---|---|---|---|
| 6,829,028 B2 | 12/2004 | Lai et al. | |
| 6,977,706 B2 | 12/2005 | Wu et al. | |
| 2006/0290868 A1 | 12/2006 | Cho et al. | |
| 2012/0099037 A1* | 4/2012 | Park | G02F 1/13624 349/33 |
| 2012/0327350 A1* | 12/2012 | Chang | G02F 1/133371 349/139 |

FOREIGN PATENT DOCUMENTS

| | | |
|---|---|---|
| CN | 100474054 C | 4/2009 |
| CN | 102789104 A | 11/2012 |
| CN | 103018979 A | 4/2013 |
| CN | 104460107 A | 3/2015 |
| JP | 2010026324 A | 2/2010 |

* cited by examiner

*Primary Examiner* — Edmond Lau
(74) *Attorney, Agent, or Firm* — McClure, Qualey & Rodack, LLP (57) ABSTRACT

A representative LCD system includes: liquid crystal material disposed between first and second substrates; protrusions supported by the first substrate and arranged in an array, each of the protrusions extending from a base; first pixel electrodes, with a corresponding one of the first pixel electrodes being positioned adjacent the base of a corresponding one of the protrusions; first common electrodes, with a corresponding one of the first common electrodes being positioned adjacent the base of a corresponding one of the protrusions such that each of the protrusions is positioned between one of the first pixel electrodes and one of the first common electrodes; second pixel electrodes, with a corresponding one of the second pixel electrodes being positioned on a corresponding one of the protrusions; and second common electrodes, with a corresponding one of the second common electrodes being positioned on a corresponding one of the protrusions.

19 Claims, 10 Drawing Sheets

LIQUID CRYSTAL DISPLAY SYSTEMS AND RELATED METHODS

BACKGROUND

Technical Field

The disclosure generally relates to liquid crystal displays.

Description of the Related Art

Liquid crystal displays (LCDs) are widely used in electronic devices, such as laptops, smart phones, digital cameras, billboard-type displays, and high-definition televisions.

LCD panels may be configured as disclosed, for example, in Wu et al., U.S. Pat. No. 6,956,631, which is assigned to AU Optronics Corp., the parent company of the assignee of the current application, and hereby incorporated by reference in its entirety. As disclosed in Wu et al. FIG. 1, the LCD panel may comprise a top polarizer, a lower polarizer, a liquid crystal cell, and a back light. Light from the back light passes through the lower polarizer, through the liquid crystal cell, and then through the top polarizer. As further disclosed in Wu et al. FIG. 1, the liquid crystal cell may comprise a lower glass substrate and an upper substrate containing color filters. A plurality of pixels comprising thin film transistor (TFT) devices may be formed in an array on the glass substrate, and a liquid crystal compound may be filled into the space between the glass substrate and the color filter forming a layer of liquid crystal material.

As explained in Sawasaki et al., U.S. Pat. No. 7,557,895, which is assigned to AU Optronics Corp., the parent company of the assignee of the current application, and hereby incorporated by reference in its entirety, the thickness of the liquid crystal layer typically must be uniformly controlled, in order to avoid unevenness in brightness across the LCD panel. As disclosed in Sawasaki et al., the required uniformity may be achieved by disposing a plurality of pillar spacers between the TFT substrate and the color filter substrate. As further disclosed in Sawasaki et al., the pillar spacers may be formed with different heights, such that some spacers have a height that is greater than the gap between the substrates and other spacers have a height that is less than the gap between the substrates. This configuration may permit the spacing between the substrates to vary with temperature changes but also prevent excessive deformation when forces are applied to the panel.

Sawasaki et al. further discloses a method for assembling the substrates with the liquid crystal material between them. This method comprises steps of preparing the two substrates, coating a sealing material on the circumference of the outer periphery of one of the pair of substrates, dropping an appropriate volume of liquid crystal on one of the pair of substrates, and filling in the liquid crystal between the pair of substrates by attaching the pair of substrates in a vacuum followed by returning the attached pair of substrates to atmospheric pressure.

In LCD panels, the semiconductor material making up the TFT channel may be amorphous silicon. However, as disclosed in Chen, U.S. Pat. No. 6,818,967, which is assigned to AU Optronics Corp., the parent company of the assignee of the current application, and hereby incorporated by reference in its entirety, poly-silicon channel TFTs offer advantages over amorphous silicon TFTs, including lower power and greater electron migration rates. Poly-silicon may be formed by converting amorphous silicon to poly-silicon via a laser crystallization or laser annealing technique. Use of the laser permits fabrication to occur at temperatures below 600° C., and the fabricating technique is thus called low temperature poly-silicon (LTPS). As disclosed in Chen, the re-crystallization process of LTPS results in the formation of mounds on the surface of the poly-silicon layer, and these mounds impact the current characteristics of the LTPS TFT. Chen discloses a method to reduce the size of the LTPS surface mounds, by performing a first anneal treatment, then performing a surface etching treatment, for example using a solution of hydrofluoric acid, and then performing a second anneal treatment. The resulting LTPS surface has mounds with a height/width ratio of less than 0.2. A gate isolation layer, gate, dielectric layer, and source and drain metal layers can then be deposited above the LTPS layer to form a complete LTPS TFT.

As disclosed in Sun et al., U.S. Pat. No. 8,115,209, which is assigned to AU Optronics Corp., the parent company of the assignee of the current application, and hereby incorporated by reference in its entirety, a disadvantage of LTPS TFTs compared to amorphous silicon TFTs is a relatively large leakage current during TFT turn off. Use of multiple gates reduces leakage current, and Sun et al. discloses a number of different multi-gate structures for a polycrystalline silicon TFT, including those shown in Sun et al. FIGS. 2A-2B and 3-6.

As is well-known in the art, commonly-used liquid crystal molecules exhibit dielectric anisotropy and conductive anisotropy. As a result, the molecular orientation of liquid crystals can be shifted under an external electric field. By varying the strength of the external electric field, the brightness of the light that passes through the polarizers and the liquid crystal material can be controlled. By applying different electric fields within different pixels of the array, and by providing different color filters for different pixels, the brightness and color of the light passing through each point in the LCD panel can be controlled, and a desired image formed.

LCD panels may also be configured as disclosed, for example, in Wu et al., U.S. Pat. No. 6,977,706, which is assigned to AU Optronics Corp., the parent company of the assignee of the current application, and hereby incorporated by reference in its entirety. As disclosed therein, an in-plane switching mode liquid crystal display (IPS-LCD) includes a top substrate, a bottom substrate, and a plurality of liquid crystal molecules filled in between the top substrate and the bottom substrate. Electrodes are provided along one of the substrates (e.g., the bottom substrate) in an interleaved (i.e., comb-like) arrangement so that electric fields extend between corresponding pairs of the electrodes during operation. Unfortunately, the volume of liquid crystal material located above an electrode (known as a dead zone) is relatively uncontrolled due to the convergence of the electric field lines at the electrode, resulting in a corresponding reduction in light transmissivity.

Accordingly, there is a desire to reduce the influence of dead zones, particularly in IPS-LCDs.

SUMMARY

Liquid crystal display systems and related methods involving pixel arrays with alternating electric field configurations are provided. In one embodiment, a liquid crystal display (LCD) system comprises: a first substrate; a second substrate spaced from the first substrate; liquid crystal material disposed between the first substrate and the second substrate; a plurality of protrusions supported by the first substrate and arranged in an array, each of the protrusions extending from a base; a plurality of first pixel electrodes, with a corresponding one of the first pixel electrodes being positioned adjacent the base of a corresponding one of the protrusions; a plurality of first common electrodes, with a corresponding one of the first common electrodes being positioned adjacent the base of a corresponding one of the protrusions such that each of the protrusions is positioned between one of the first pixel electrodes and one of the first common electrodes; a plurality of second pixel electrodes, with a corresponding one of the second pixel electrodes being positioned on a corresponding one of the protrusions; and a plurality of second common electrodes, with a corresponding one of the second common electrodes being positioned on a corresponding one of the protrusions.

In another embodiment, a method of driving an LCD having an array of pixels comprises: providing a plurality of protrusions across the array of pixels; and using an alternating series of electric field configurations across the array of pixels to alter transmissivity of the pixels such that a first pixel electrode in the series exhibits a first electric field configuration, a second pixel electrode in the series exhibits a second electric field configuration, and a third pixel electrode in the series exhibits the first electric field configuration, the second pixel electrodebeing adjacent to the first pixel electrode, and the third pixel electrodebeing adjacent to the second pixelelectrode.

Other objects, features, and/or advantages will become apparent from the following detailed description of the preferred but non-limiting embodiments. The following description is made with reference to the accompanying drawings.

DETAILED DESCRIPTION

For ease in explanation, the following discussion describes embodiments of the present disclosure in the context of an LCD system. It is to be understood that the invention is not limited in its application to the details of the particular arrangements shown since the invention is capable of other embodiments. Also, the terminology used herein is for the purpose of description and not of limitation.

In this regard, LCD systems and related methods with involving pixel arrays with alternating electric field configurations are provided. As will be described in greater detail below, such systems and methods may involve the use electrodes positioned at different heights in order to provide layered electric fields for controlling liquid crystal material. So configured, the systems and methods may tend to mitigate dead zones typically associated with electrodes of IPS-LCDs and increase transmissivity. The preferred embodiments will now be described with reference to the drawings.

Figure 1:
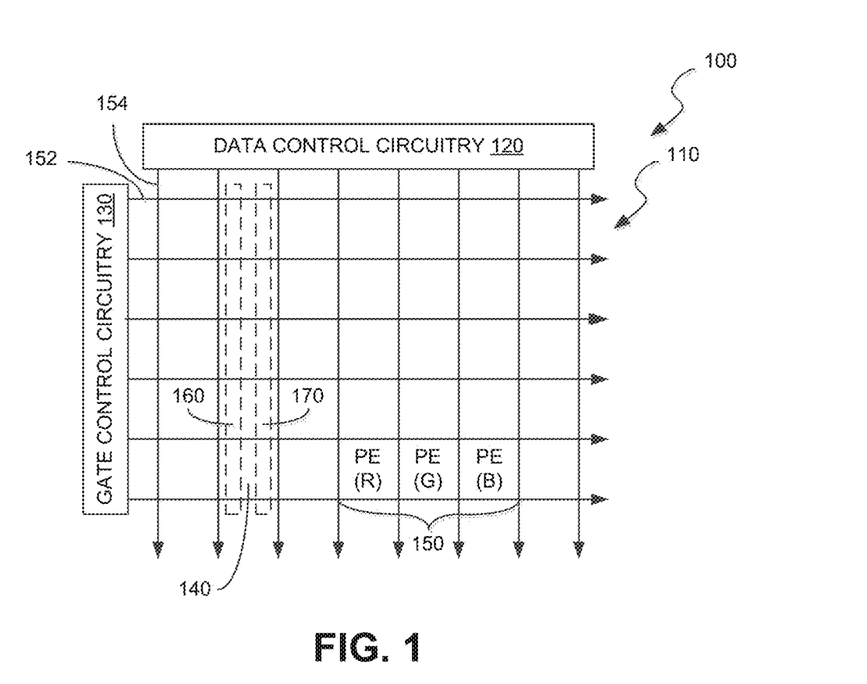
FIG. 1 is a schematic diagram of an embodiment of an LCD system.

With reference to FIG. 1, an embodiment of an LCD system 100 is depicted. Fundamentally, LCD system 100 includes an LCD panel 110 with a plurality of pixels, data control circuitry 120 and gate control circuitry 130. The circuits and functions in the embodiments of the present invention can be implements by hardware, software or a combination of hardware and software such as microcontrollers, application-specific integrated circuits (ASIC) and programmable microcontrollers.

LCD panel 110 incorporates a plurality of pixels (typically thousands of pixels, e.g., pixels 140, 150), which are arranged in a two-dimensional array comprising a plurality of rows and columns. For ease of illustration, only a few pixels are shown. As is known, in a thin film transistor (TFT) LCD panel, a pixel is typically formed from three pixel elements (PEs): one red, one green, and one blue, although various configurations may be used. For instance, pixel 150 is depicted as including three PEs—PE(R), PE(G) and PE(B). One or more transistors and one or more storage capacitors are typically coupled to each pixel element, thereby forming driving circuitry for the associated pixel element.

The transistors of all pixels in a given row typically have their gate electrodes connected to a gate line (e.g., line 152), and their source electrodes connected to a data line (e.g., line 154). The gate control circuitry 130 and data control circuitry 120 control the voltage applied to the respective gate and data lines to individually address each pixel element in the LCD panel. By controllably pulsing the respective pixel element driving transistors, the driving circuits can control the transmissivity of each PE, and thereby control the color of each pixel. The storage capacitors assist in maintaining the charge across each pixel between successive pulses (which are delivered in successive frames). Common lines (not shown) provide reference (common) signals for the electrodes.

Also depicted in FIG. 1 are elongate protrusions (e.g., protrusions 160 and 170) that extend across the panel. In this embodiment, parallel protrusions are provided for each pixel element (note only two such protrusions 160 and 170 are depicted for ease of illustration), although various other numbers and configurations may be used.

Figure 2:
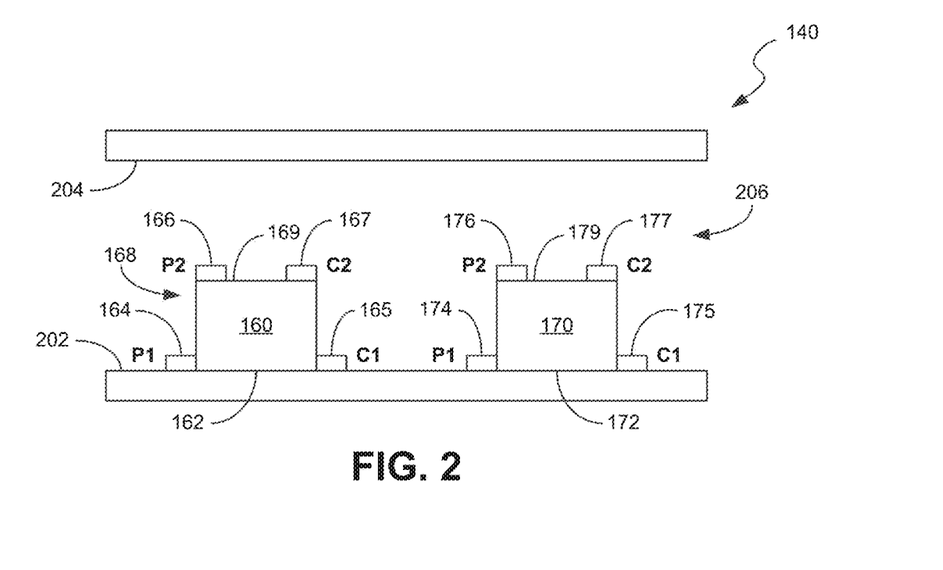
FIG. 2 is a schematic diagram of the embodiment of FIG. 1 showing a portion of the LCD panel in cross-section.

Pixel 140 is depicted schematically in cross-section in FIG. 2. As shown in FIG. 2, pixel 140 is formed by a first substrate 202, a second substrate 204 that is spaced from and parallel to substrate 202, and liquid crystal material 206 (e.g., blue phase liquid crystal (BPLC)) disposed between the substrates. Protrusions 160 and 170 extend through the pixel area associated with pixel 140. The protrusions, each of which exhibits a generally rectangular cross-section, are supported by substrate 202, with each extending upwardly from a base (162 and 172, respectively). In a typical embodiment, the height of a protrusion is approximately 0.5 µm or greater.

Each of the protrusions 160, 170 is associated with a first pixel electrode, a first common electrode, a second pixel electrode and a second common electrode. Specifically, protrusion 160 is associated with first pixel electrode 164, first common electrode 165, second pixel electrode 166 and second common electrode 167; protrusion 170 is associated with first pixel electrode 174, first common electrode 175, second pixel electrode 176 and second common electrode 177. In this embodiment, the first pixel electrodes 164, 174 and the first common electrodes 165, 175 are positioned adjacent the respective bases (162, 172) of the corresponding protrusions. As such, each protrusion is positioned between one of the first pixel electrodes and one of the first common electrodes. For example, the protrusion 160 is positioned between the first pixel electrode 164 and the first common electrode 165.

The second pixel electrodes 166, 176 and second common electrodes 167, 177 are positioned on their respective protrusions. As shown in FIG. 2, second pixel electrode 166 and second common electrode 167 are positioned on an upper portion 168 (i.e., an upper half) of protrusion 160 and, thus, are spaced from substrate 202 by at least one-half the height of protrusion 160. In this embodiment, both second pixel electrode 166 and second common electrode 167 are positioned on a top surface 169 of protrusion 160 that is parallel to substrate 202. A similar configuration is shown with respect to protrusion 170 and the associated electrodes 174, 175, 176 and 177. The aforementioned configuration provides an alternating series of first pixel electrode-first common electrode pairs (e.g., pair 165, 174) and second pixel electrode-second common electrode pairs (e.g., pair 166, 167, and pair 176, 177).

Figure 3:
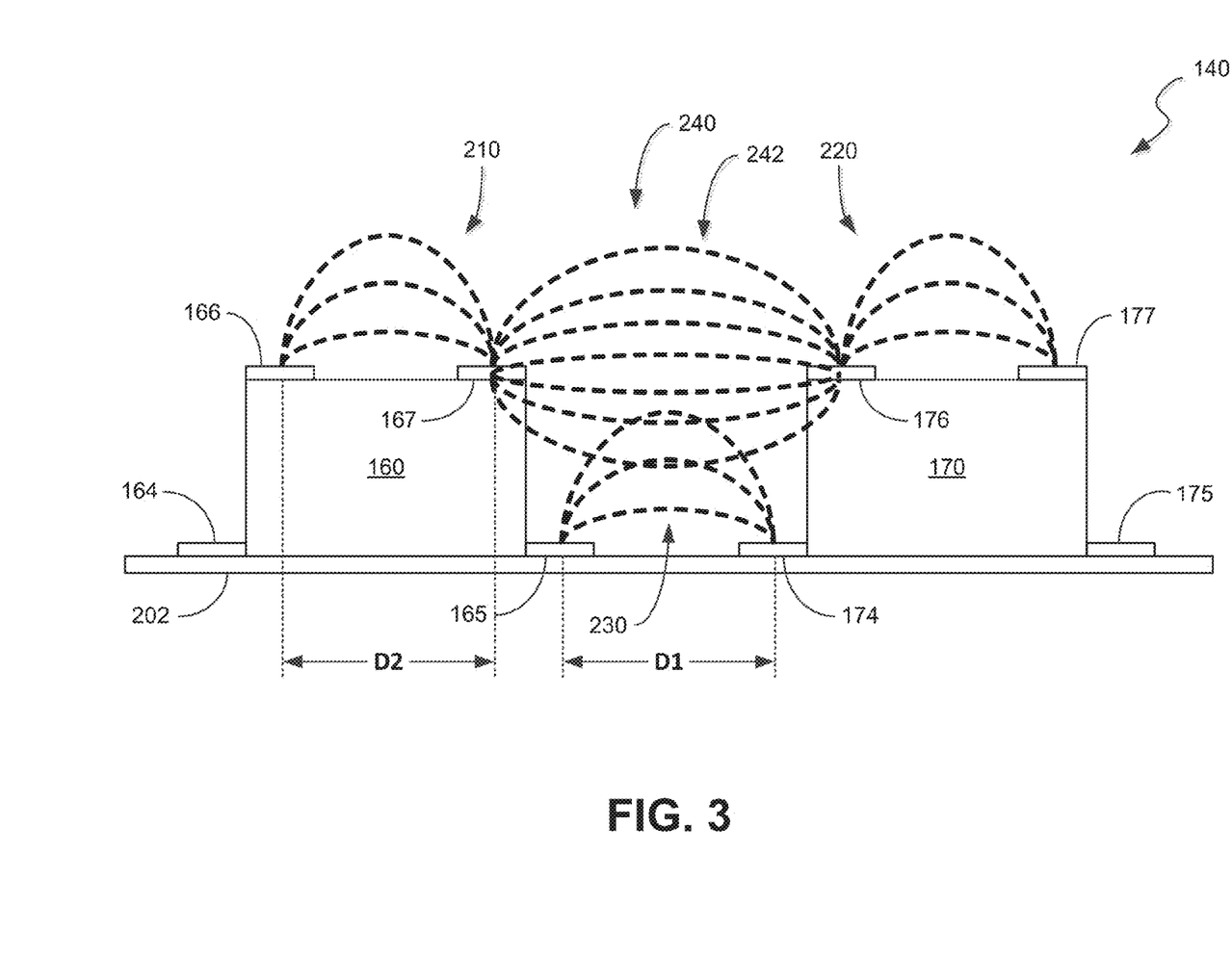
FIG. 3 is a schematic diagram of the embodiment of FIG. 1 showing representative electric field lines.

In operation, such as depicted in FIG. 3, each of the electrode pairs exhibits an electric field. Specifically, electrodes 166, 167 exhibit an electric field 210 that extends across the top of protrusion 160, and electrodes 176, 177 exhibit an electric field 220 that extends across the top of protrusion 170. Electrodes 165, 174 also exhibit an electric field 230 that extends between protrusions 160 and 170. Moreover, electrodes 167, 176 exhibit an electric field 240 that spans a gap 242 between the protrusions such that electric field 240 is in an overlying relationship with respect to electric field 230. Significantly, the presence of electric field 240 and its position with respect to electrodes 165 and 174 tend to mitigate (e.g., remove) the dead zones that would normally be exhibited above those electrodes in the absence of electric field 240.

In this embodiment, electric fields 210, 220 and 230 may be similar in that the relative spacing (e.g., D1=D2) and configuration of and voltages applied to the electrodes are similar, resulting is substantially equivalent electric field strengths. However, in other embodiments, various other relationships may be used. By way of example, in some embodiments, the electric field strengths of the fields 210 and 220 may be higher than that of field 230, whereas in other embodiments, the electric field strengths of the fields 210 and 220 may be lower than that of field 230. As another example, in some embodiments, the spacing between the electrodes may be altered such that the spacing between the electrodes on the protrusions is shorter that the spacing between the electrodes on the substrate (i.e., D2<D1). For a set voltage across the electrodes, the spacing results in an electric filed strength that is higher for the electrodes on the protrusions.

Figure 4:
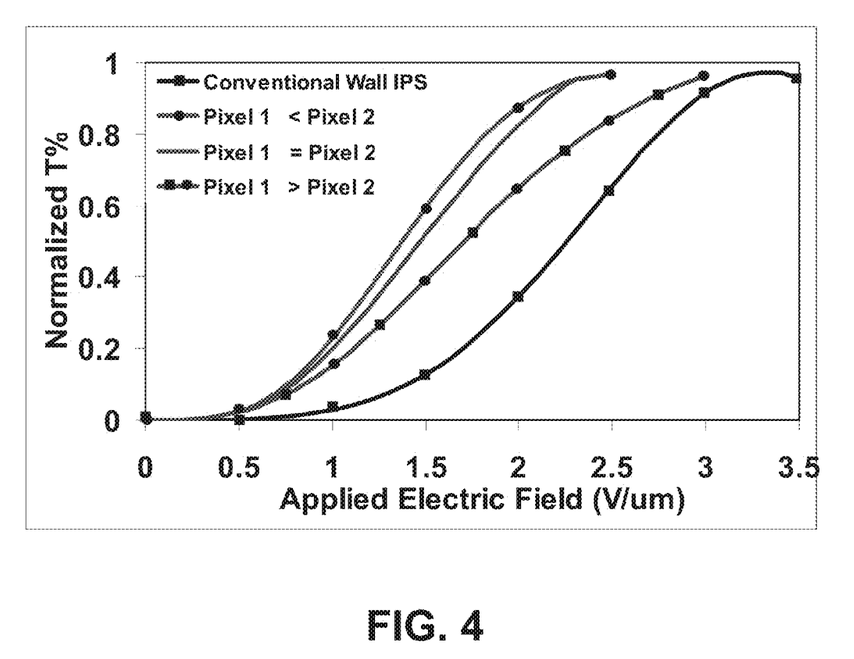
FIG. 4 is a diagram depicting applied electric field versus normalized transmissivity for various applied voltages.

Applied electric field (V/µm) versus normalized transmissivity (%) for various applied voltages based on the embodiment of FIG. 3 is depicted in FIG. 4. In the diagram of FIG. 4, "Pixel 1" is associated with the first pixel electrodes (e.g., electrode 174 and electrode 165 located at the base of the protrusion and electric field 230) and "Pixel 2" is associated with the second pixel electrodes (e.g., electrode 176 and electrode 177 located on top of the protrusion and electric field 220).

As shown, compared to conventional wall IPS, efficiency improves as the electric field strength of Pixel 2 is increased relative to that of Pixel 1. That is, in some embodiments, it may be beneficial to configure an associated pixel array such that the elevated electrodes (i.e., the electrodes most displaced from the supporting substrate, such as those on the protrusions) exhibit stronger electric fields than the lower electrodes (i.e., the electrodes least displaced from the supporting substrate, such as those adjacent the bases of the protrusions). Accordingly, in the diagram of FIG. 4, when the elevated electrodes exhibit stronger electric fields than the lower electrodes (Pixel1<Pixel 2), the display can achieve normalized transmissivity with the same applied electric field compared to the other embodiment, Pixel1=Pixel 2 or Pixel1>Pixel 2.

The aforementioned relationship is also evident in Table 1 (below), which shows the voltage relation of Pixel 1 and Pixel 2 with the same common voltage. As shown, when the voltage of Pixel 2 is higher than that of Pixel 1, the saturation electric filed is low. Thus, a lower voltage may be used to achieve high transmittance.

TABLE 1

|  | Ratio of Pixel 1/Pixel 2 | Saturation Electric Field (V/L_m) |
| --- | --- | --- |
| Conventional Wall IPS | — | 3.30 |
| Pixel 1 < Pixel 2 | 0.01 | 1.70 |
|  | 0.1 | 1.70 |
|  | 0.2 | 1.74 |
|  | 0.4 | 1.85 |
|  | 0.6 | 2.08 |
|  | 0.8 | 2.36 |
| Pixel 1 = Pixel 2 | 1.0 | 2.60 |
| Pixel 1 > Pixel 2 | 2.0 | 2.69 |
|  | 4.0 | 2.81 |
|  | 6.0 | 3.05 |
|  | 8.0 | 3.25 |
|  | 10.0 | 3.48 |

Thus, in some embodiments, a ratio (p) of voltage exhibited by Pixel 1 and Pixel 2 (i.e., Pixel 1/Pixel 2) is expressed by 0.01<p<10. The ration (p) of voltage exhibited by Pixel 1 and Pixel 2 can be realize by adjust the voltages of the first pixel electrodes and/or the second pixel electrodes. In addition, it can also be realized by adjust the voltage of the first common electrodes and/or the second common electrodes which is used to cooperate with the first and the second pixel electrodes to establish the electric fields.

Figure 5:
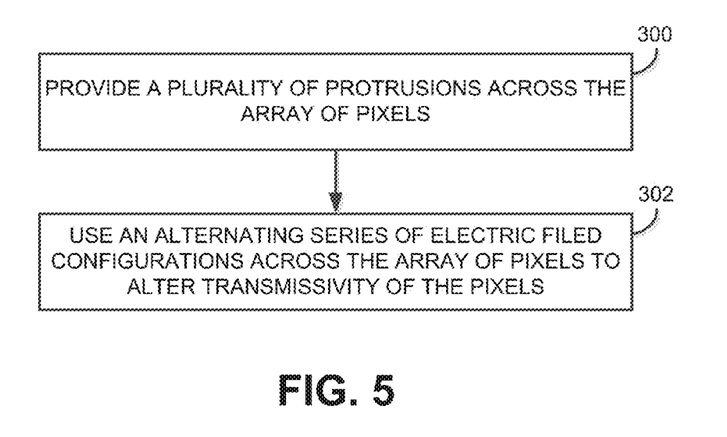
FIG. 5 is a flowchart illustrating basic operations in accordance with an embodiment.

Reference is now made to FIG. 5, which is a flowchart illustrating basic operations in accordance with an embodiment. As shown in FIG. 5, the method involves providing a plurality of protrusions across the array of pixels (block 300). In block 302, an alternating series of electric field configurations is used across the array of pixels to alter transmissivity of the pixels. By way of example, a first pixel in the series exhibits a first electric field configuration, a second pixel in the series exhibits a second electric field configuration, and a third pixel in the series exhibits the first electric field configuration. In some embodiments, the first electric field configuration incorporates a first electric field located between corresponding adjacent pairs of the protrusions and the second electric field configuration incorporates a second electric field extending across corresponding ones of the protrusions. In some of these embodiments, the first electric field configuration also includes a third electric field spanning between corresponding adjacent pairs of the protrusions such that each of the third electric fields is in an overlying relationship with a corresponding one of the first electric fields.

Figure 6:
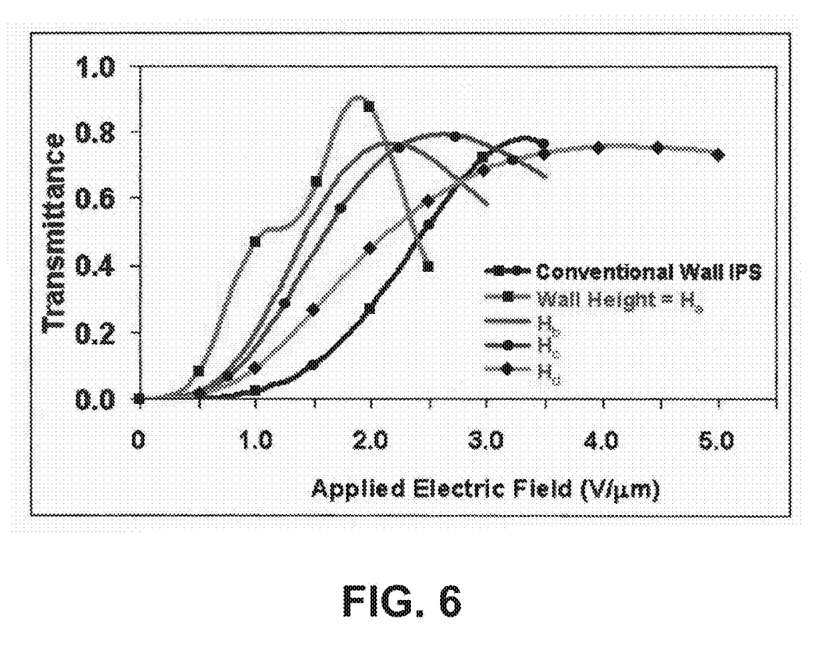
FIG. 6 is a diagram depicting applied electric field versus transmittance for various protrusion heights.

FIG. 6 is a diagram depicting applied electric field (V/μm) versus transmittance for various protrusion heights. As shown in FIG. 6, a conventional wall IPS configuration using wall height $H_a$ is compared with the configuration depicted in FIG. 3 using various protrusions heights (i.e., heights $H_a$, $H_b$, $H_c$ and $H_d$, where $H_a > H_b > H_c > H_d$). As shown, the same wall height as that used for the conventional wall IPS ($H_a$) when in the configuration of FIG. 3 results in a higher transmittance at the same applied electric field over much of the investigated range. Additionally, a decrease in wall height appears to result in a decrease in efficiency; however, the results appear better than those of the conventional wall IPS.

Figure 7:
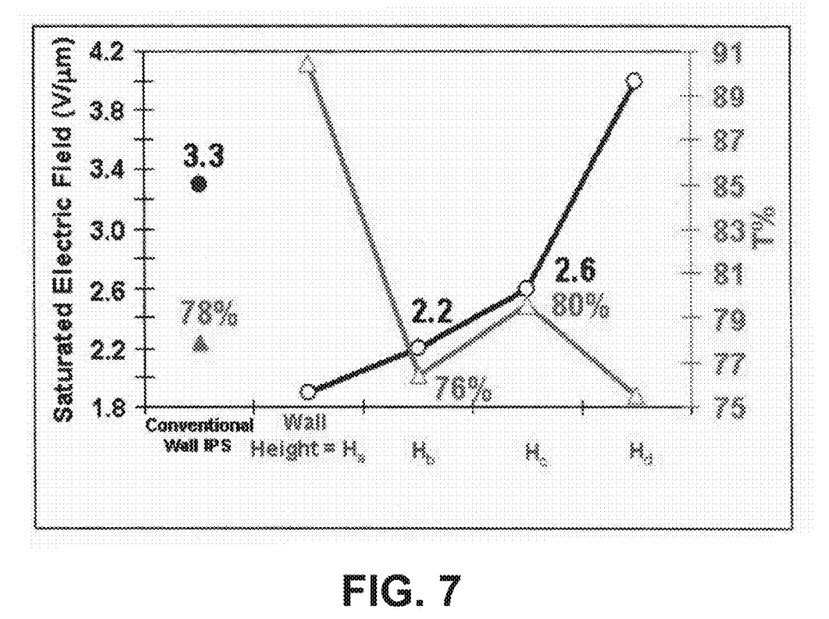
FIG. 7 is a diagram depicting saturated electric field data and transmissivity data for various protrusion heights.

FIG. 7 is a diagram depicting saturated electric field data and transmissivity data for the protrusion heights and configurations shown in FIG. 6, with Pixel 1 being equal to Pixel 2. As shown in FIG. 7, the saturated electric field value for the conventional wall IPS is 3.3 V/μm, whereas the values for $H_a$, $H_b$, $H_c$ and $H_d$ for the configuration of FIG. 3 are 1.9, 2.2, 2.6 and 3.8 V/μm, respectively. Thus, the saturation electric field value appears to increase with a decrease in wall height. Additionally, the normalized transmissivity (%) value for the conventional wall IPS is 78%, whereas the values for $H_a$, $H_b$, $H_c$ and $H_d$ for the configuration of FIG. 3 are 90, 76, 80 and 75%, respectively. Thus, the transmissivity value appears generally to decrease with a decrease in wall height.

FIGS. 8-13 are schematic diagrams (plan views) of example pixel layouts corresponding to the pixel shown in FIG. 3, which may be used in an embodiment of an LCD system. For ease of illustration, protrusions on which one or more of the electrodes may be arranged are not depicted, but are described in detail elsewhere.

Figure 8:
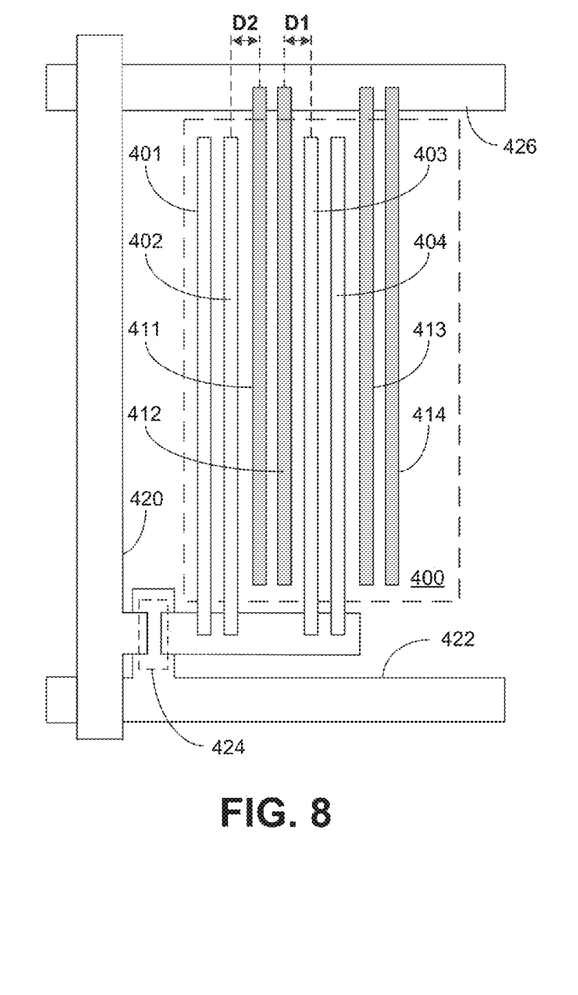
FIGS. 8-13 are schematic diagrams (plan views) of example pixel layouts that may be used in an embodiment of an LCD system.

As shown in FIG. 8, pixel 400 includes pixel electrodes interleaved with common electrodes. In particular, the pixel electrodes are arranged as elongate pairs (e.g., pixel electrode pair 401, 402 and pixel electrode pair 403, 404) that are interleaved with common electrodes, which also are arranged as elongate pairs (e.g., common electrode pair 411, 412 and common electrode pair 413, 414). The pixel electrodes are electrically coupled to data line 420 that provides data signals to the pixel electrodes in response to gate line 422 controlling TFT 424. The common electrodes are electrically coupled to common line 426.

The pixel electrode 402 and the common electrode 411 may be located on a protrusion like the second pixel electrode 166 and the second common electrode 167 depicted in FIG. 3. The common electrode 412 and the pixel electrode 403 may be located beside the protrusion like the first common electrode 165 and the first pixel electrode 174 depicted in FIG. 3. Likewise, the pixel electrode 404 and the common electrode 413 may be located on another protrusion like the corresponding electrodes depicted in FIG. 3. In addition, the distance D2 between the pixel electrode 402 and the common electrode 411 and the distance D1 between the common electrode 412 and the pixel electrode 403 may exhibit the relationship mentioned in the previous paragraph of this disclosure.

Figure 9:
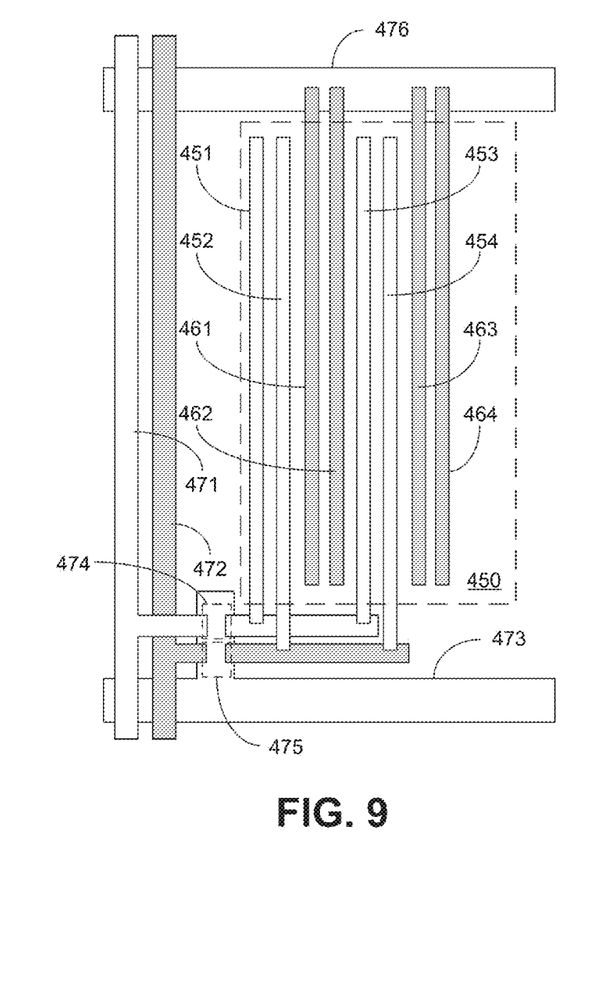

In contrast to the single data line embodiment of FIG. 8, pixel 450 of FIG. 9 includes two data lines per pixel. As shown in FIG. 9, pixel 450 includes pixel electrode pairs (e.g., pixel electrode pair 451, 452 and pixel electrode pair 453, 454) that are interleaved with common electrode pairs (e.g., common electrode pair 461, 462 and common electrode pair 463, 464). The pixel electrodes 451 and 453 are electrically coupled to data line 471, and pixel electrodes 452 and 454 are electrically coupled to data line 472. The data lines 471, 472 provide data signals to their respective pixel electrodes in response to gate line 473 controlling TFTs 474 and 475, respectively. The common electrodes are electrically coupled to common line 476. The pixel electrode 452 and pixel electrode 453 can receive different data signals from two different data lines through different TFTs, such that they can provide different electric fields as illustrated before. Similarly, the electrodes 452, 461, 454 and 463 can be elevated by protrusion(s), and the other electrodes might be located beside the protrusion.

Figure 10:
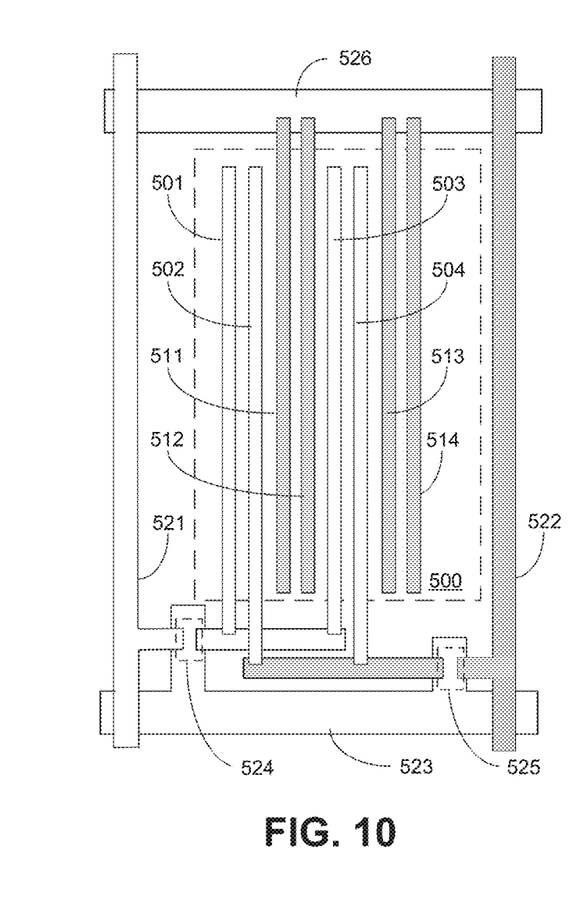

An alternative two data line embodiment is depicted in FIG. 10. As shown in FIG. 10, pixel 500 includes pixel electrode pairs (e.g., pixel electrode pair 501, 502 and pixel electrode pair 503, 504) that are interleaved with common electrode pairs (e.g., common electrode pair 511, 512 and common electrode pair 513, 514). The pixel electrodes 501 and 503 are electrically coupled to data line 521, and pixel electrodes 502 and 504 are electrically coupled to data line 522. The data lines 521, 522 provide data signals to their respective pixel electrodes in response to gate line 523 controlling TFTs 524 and 525, respectively. The common electrodes are electrically coupled to common line 526.

Figure 11:
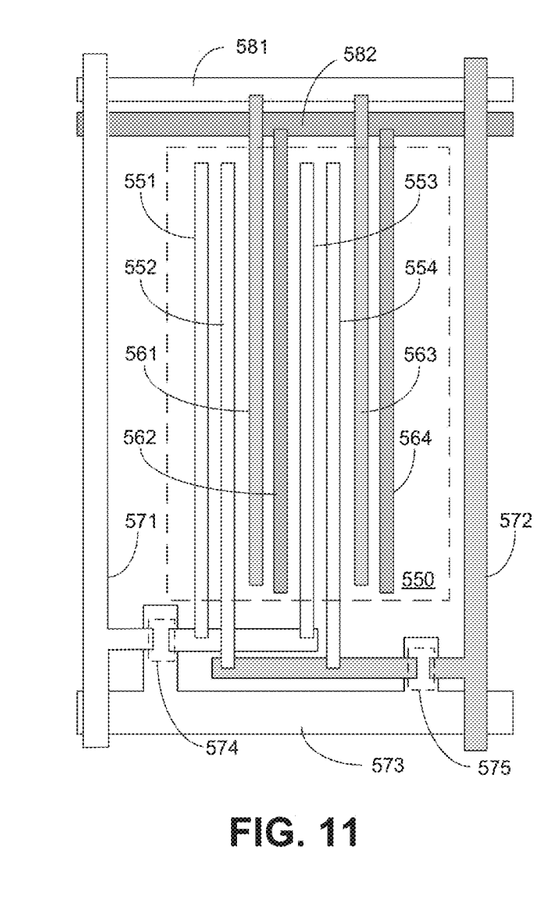

Another two data line embodiment (which also incorporates two common lines) is depicted in FIG. 11. As shown in FIG. 11, pixel 550 includes pixel electrode pairs (e.g., pixel electrode pair 551, 552 and pixel electrode pair 553, 554) that are interleaved with common electrode pairs (e.g., common electrode pair 561, 562 and common electrode pair 563, 564). Pixel electrodes 551 and 553 are electrically coupled to data line 571, and pixel electrodes 552 and 554 are electrically coupled to data line 572. Data lines 571, 572 provide data signals to their respective pixel electrodes in response to gate line 573 controlling TFTs 574 and 575, respectively. The common electrodes 561 and 563 are electrically coupled to common line 581, and common electrodes 562 and 564 are electrically coupled to data line 582. The pixel 550 incorporates two common lines, electrical fields with different strengths can, therefore, be established through providing different common voltages to cooperate with identical or different data voltages.

Figure 12:
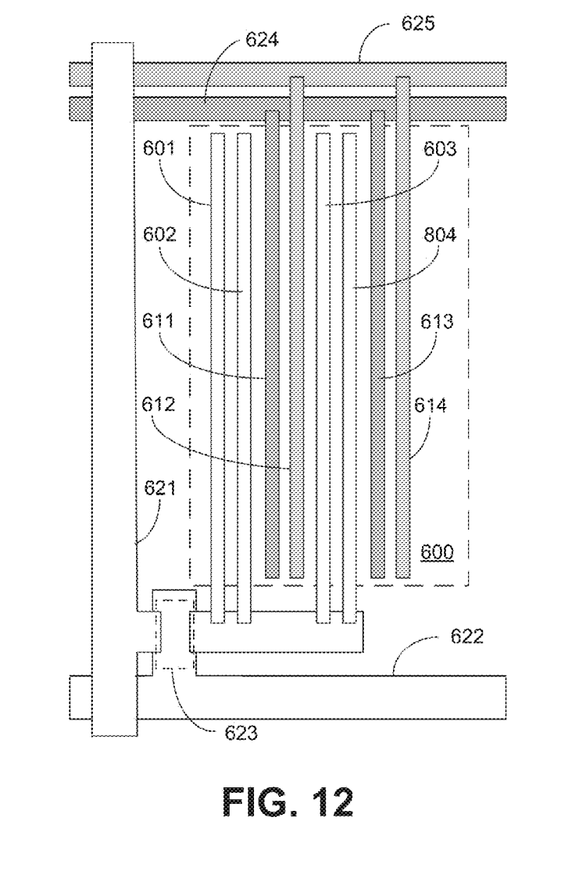

The embodiment of FIG. 12 incorporates a single data line and two common lines per pixel. As shown in FIG. 12, pixel 600 includes pixel electrode pairs (e.g., pixel electrode pair 601, 602 and pixel electrode pair 603, 604) that are interleaved with common electrode pairs (e.g., common electrode pair 611, 612 and common electrode pair 613, 614). The pixel electrodes 601-604 are electrically coupled to data line 621. Data lines 621 provides data signals to the pixel electrodes in response to gate line 622 controlling TFT 623. Common electrodes 611 and 613 are electrically coupled to common line 624, and common electrodes 612 and 614 are electrically coupled to common line 625.

Figure 13:
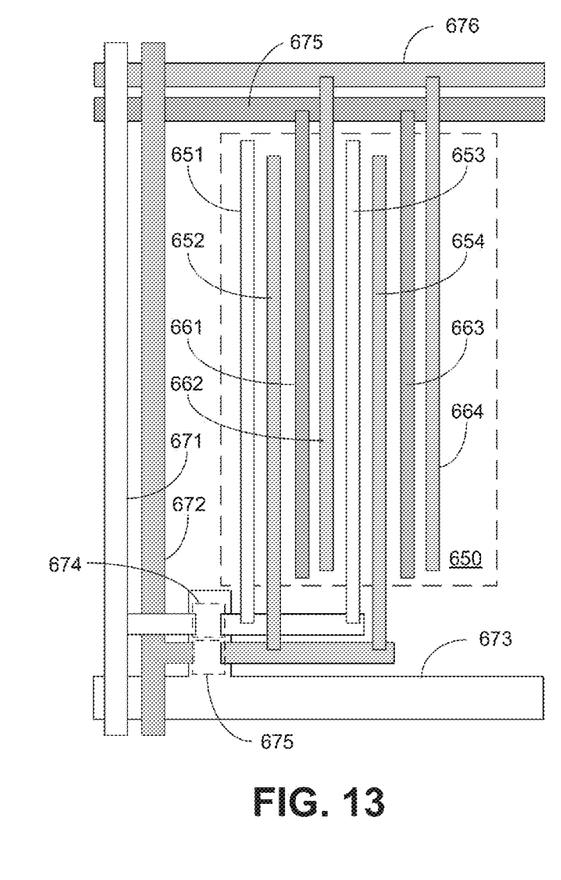

In contrast, the embodiment of FIG. 13 incorporates two data lines and two common lines per pixel. As shown in FIG. 13, pixel 650 includes pixel electrode pairs (e.g., pixel electrode pair 651, 652 and pixel electrode pair 653, 654) that are interleaved with common electrode pairs (e.g., common electrode pair 661, 662 and common electrode pair 663, 664). Pixel electrodes 651 and 653 are electrically coupled to data line 671, and pixel electrodes 652 and 654 are electrically coupled to data line 672. Data lines 671, 672 provide data signals to their respective pixel electrodes in response to gate line 673 controlling TFTs 674 and 675, respectively. Common electrodes 661 and 663 are electrically coupled to common line 675, and common electrodes 662 and 664 are electrically coupled to common line 676.

FIGS. 14A-14F are schematic, cross-sectional views of example embodiments of electrode configurations. It should be noted that all of the protrusions of these particular figures are rectangular in cross-section for ease of illustration only as many of the aspects presented may be applicable to other protrusions shapes, such as those described with respect to FIGS. 15A-15D.

Figure 14A:
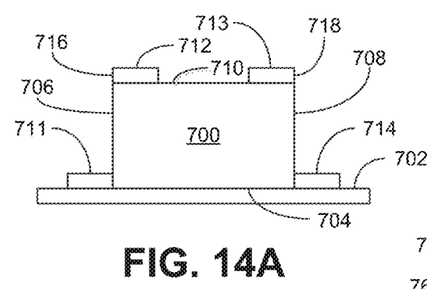
FIGS. 14A-14F are schematic, cross-sectional views of example embodiments of electrode configurations.

As shown in FIG. 14A, a protrusion 700 is supported by a substrate 702. Protrusion 700 includes a base 704, opposing sidewalls 706, 708, and a top surface 710. Electrodes 711, 712, 713 and 714 also are depicted. Specifically, electrode 711 (e.g., a first pixel electrode) is supported by substrate 702 and is positioned adjacent base 704 and sidewall 706. Electrode 714 (e.g., a first common electrode) is supported by substrate 702 and is positioned adjacent base 704 and sidewall 708. In this embodiment, the electrodes 711 and 714 directly contact both the substrate and corresponding sidewalls of the protrusion.

Additionally, electrodes 712 and 713 (e.g., a second pixel electrode and a second common electrode, respectively) are supported by top surface 710, with outside edge 716 of electrode 712 being aligned with sidewall 706, and outside edge 718 of electrode 713 being aligned with sidewall 708. In this embodiment, the electrodes 712 and 713 directly contact top surface 710.

Figure 14B:
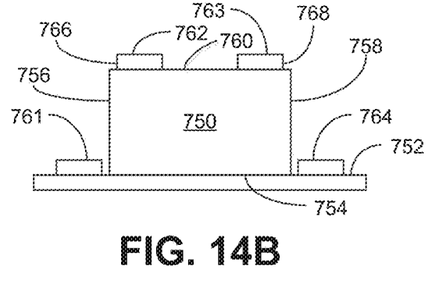

In FIG. 14B, a protrusion 750 is supported by a substrate 752. Protrusion 750 includes a base 754, opposing sidewalls 756, 758, and a top surface 760. Electrodes 761, 762, 763 and 764 also are depicted. Specifically, electrode 761 is supported by substrate 752 and is positioned adjacent base 754 and sidewall 756, while electrode 764 is supported by substrate 752 and is positioned adjacent base 754 and sidewall 758. In this embodiment, the electrodes 761 and 764 directly contact the substrate; however, electrodes 761 and 764 are spaced from the corresponding sidewalls of the protrusion.

Additionally, electrodes 762 and 763 are supported by top surface 760, with outside edge 766 of electrode 762 being set back from the edge formed by sidewall 756. Similarly, outside edge 768 of electrode 763 is set back from the edge formed by sidewall 758. In this embodiment, the electrodes 762 and 763 directly contact top surface 760.

Figure 14C:
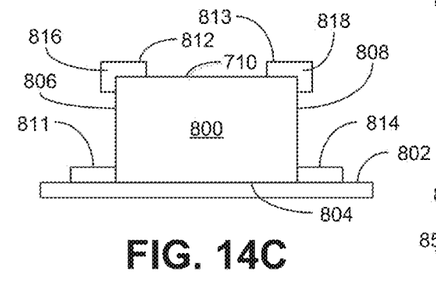

As shown in FIG. 14C, a protrusion 800 is supported by a substrate 802 and includes a base 804, opposing sidewalls 806, 808, and a top surface 810. Electrodes 811, 812, 813 and 814 also are depicted. Specifically, electrode 811 is supported by substrate 802 and is positioned adjacent base 804 and sidewall 806. Electrode 814 is supported by substrate 802 and is positioned adjacent base 804 and sidewall 808. In this embodiment, the electrodes 811 and 814 directly contact both the substrate and corresponding sidewalls of the protrusion.

Additionally, electrodes 812 and 813 are supported by top surface 810. In contrast to the previous embodiments, each of the protrusions incorporates an overhang portion that extends beyond the sidewall of the protrusion. Specifically, electrode 812 includes an overhang portion 816, and electrode 813 includes an overhang portion 818. In this embodiment, the electrodes 812 and 813 directly contact top surface 810 as well as the corresponding sidewalls.

Figure 14D:
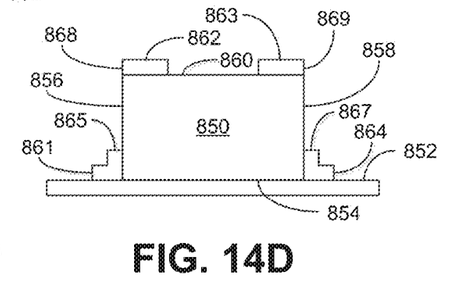

In the embodiment of FIG. 14D, a protrusion 850 is supported by a substrate 852 and includes a base 854, opposing sidewalls 856, 858, and a top surface 860. Electrodes 861, 862, 863 and 864 also are depicted. Specifically, electrode 861 is supported by substrate 852 and is positioned adjacent base 854 and sidewall 856. Electrode 864 is supported by substrate 852 and is positioned adjacent base 854 and sidewall 858. In this embodiment, the electrodes 861 and 864 directly contact both the substrate and corresponding sidewalls of the protrusion. However, each of these electrodes incorporates an extended portion (865 and 867, respectively) that extends up the corresponding sidewall.

Additionally, electrodes 862 and 863 are supported by top surface 860, with outside edge 868 of electrode 862 being aligned with sidewall 856, and outside edge 869 of electrode 863 being aligned with sidewall 588. In this embodiment, the electrodes 852 and 853 directly contact top surface 860.

Figure 14E:
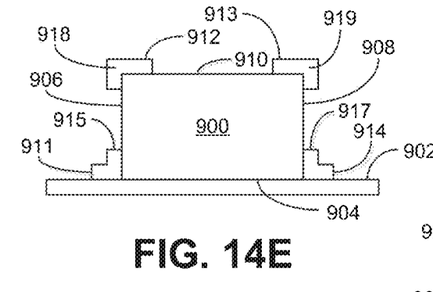

In the embodiment of FIG. 14E, a protrusion 900 is supported by a substrate 902 and includes a base 904, opposing sidewalls 906, 908, and a top surface 910. Electrodes 911, 912, 913 and 914 also are depicted. Specifically, electrode 911 is supported by substrate 902 and is positioned adjacent base 904 and sidewall 906. Electrode 914 is supported by substrate 902 and is positioned adjacent base 904 and sidewall 908. In this embodiment, the electrodes 911 and 914 directly contact both the substrate and corresponding sidewalls of the protrusion. Additionally, each of these electrodes incorporates an extended portion (915 and 917, respectively) that extends up the corresponding sidewall. The width of the extended portion 915 and 917 may be not substantially less than the width of the electrode 911 and 914.

Additionally, electrodes 912 and 913 are supported by top surface 910. Each of these protrusions incorporates an overhang portion that extends beyond the sidewall of the protrusion. Specifically, electrode 912 includes an overhang portion 918, and electrode 913 includes an overhang portion 919. In this embodiment, the electrodes 912 and 913 directly contact top surface 910 as well as the corresponding sidewalls.

Figure 14F:
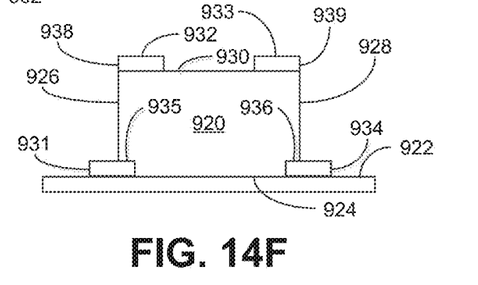

In the embodiment of FIG. 14F, a protrusion 920 is supported by a substrate 9222 and includes a base 924, opposing sidewalls 266, 928, and a top surface 930. Electrodes 931, 932, 933 and 934 also are depicted. Specifically, electrode 931 is supported by substrate 922 and is positioned such that a portion 935 of the electrode extends beyond the sidewall 926 (e.g., under the protrusion). Similarly, electrode 934 is supported by substrate 922 and is positioned such that a portion 936 of the electrode extends beyond the sidewall 928. Additionally, electrodes 932 and 933 are supported by top surface 930, with outside edge 938 of electrode 932 being aligned with sidewall 926, and outside edge 939 of electrode 933 being aligned with sidewall 928. In this embodiment, the electrodes 932 and 933 directly contact top surface 930.

Figure 15A:
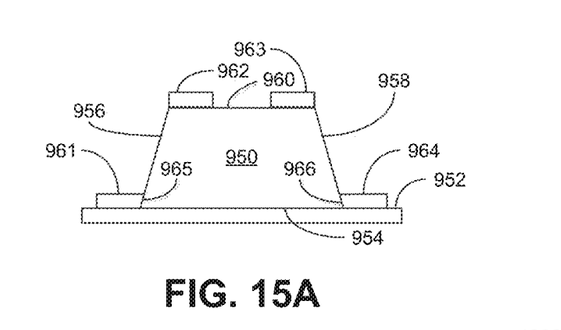
FIGS. 15A-15D are schematic, cross-sectional views of example embodiments of protrusion configurations.

FIGS. 15A-15D are schematic, cross-sectional views of example embodiments of protrusion configurations that may be used with the electrode configurations previously described. As shown in FIG. 15A, protrusion 950 is supported by a substrate 952 and exhibits a trapezoidal cross-section including a base 954, opposing sidewalls 956, 958, and a top surface 960.

FIG. 15A also depicts electrodes 961, 962, 963 and 964. Electrodes 961 and 964 are positioned adjacent base 954 and a corresponding sidewall. Note that in this embodiment, the inside edges (965 and 966, respectively) of these electrodes conform to the exterior of the corresponding sidewalls.

Figure 15B:
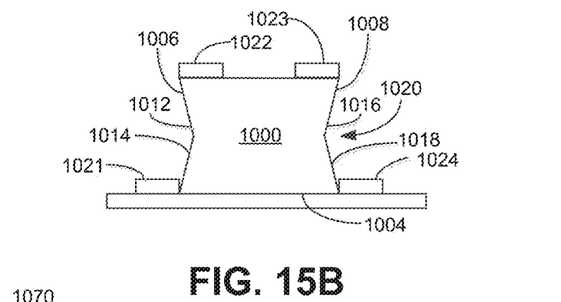

In FIG. 15B, protrusion 1000 is shown that exhibits a double-trapezoidal cross-section including a base 1004, opposing sidewalls 1006, 1008, and a top surface 1010. Each of the sidewalls includes a pair of wall segments (e.g., sidewall 1006 includes upper segment 1012 and a lower segment 1014, and sidewall 1008 includes upper segment 1016 and a lower segment 1018). Notably, the wall segments of each pair are inclined toward each other to form a necked portion 1020. Electrodes 1021, 1022, 1023 and 1024 also are depicted.

Figure 15C:
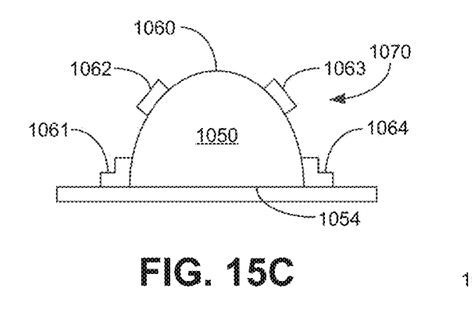

In the embodiment of FIG. 15C, protrusion 1050 exhibits a domed (e.g., hemispherical) cross-section including a base 1054 and a continuous top surface 1060. Electrodes 1061, 1062, 1063 and 1064 directly contact surface 1060, with electrodes 1062 and 1063 being located at the upper portion 1070 (i.e., the upper one-half of the protrusion).

Figure 15D:
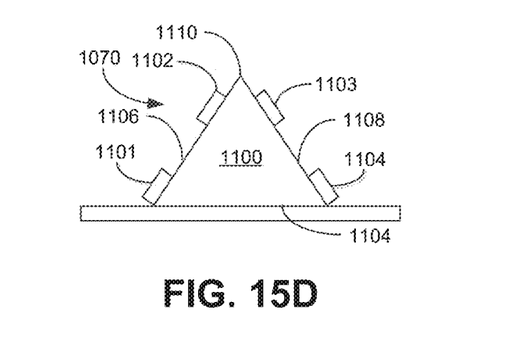

As shown in FIG. 15D, protrusion 1100 exhibits a triangular cross-section including a base 1104, and sidewalls 1106, 1108 that join at apex 1110. Electrodes 1101, 1102, 1103 and 1104 directly contact corresponding sidewalls, with electrodes 1102 and 1103 being located at the upper portion 1120 of the protrusion. Note that, unlike the other depicted embodiments, all of the electrodes are supported by the protrusion 1100.

Figure 16:
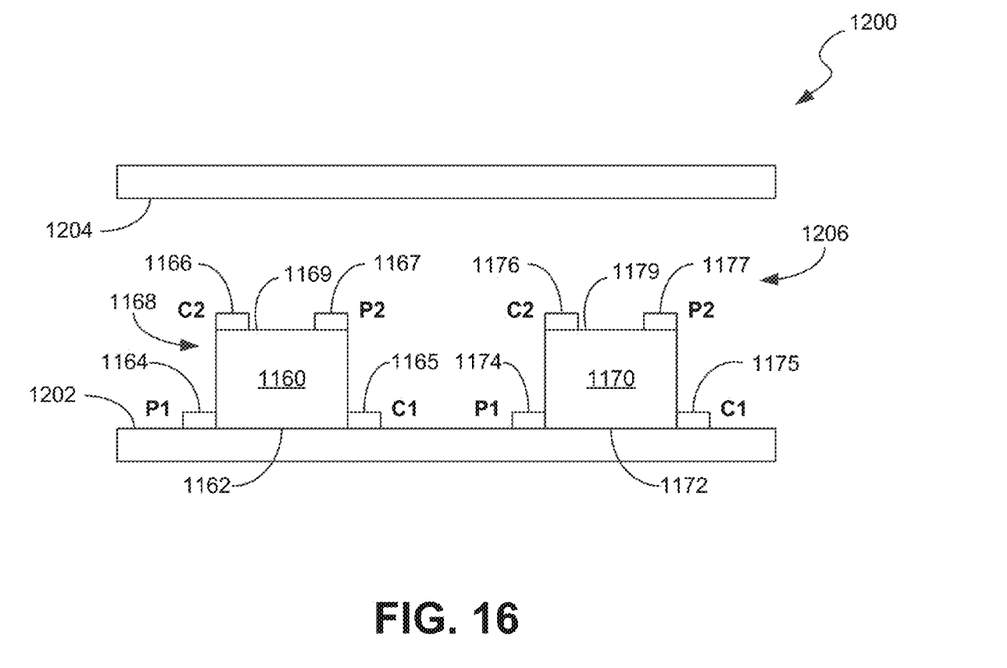
FIG. 16 is a schematic diagram of another embodiment.

The relation of the position between the protrusions and the electrode disclosed in FIG. 14A to FIG. 14E can also be applied in each of the protrusions with the shapes disclosed in FIG. 15A to FIG. 15D Another embodiment of a pixel is depicted schematically in cross-section in FIG. 16. As shown in FIG. 16, pixel 1200 is formed by a first substrate 1202, a second substrate 1204 that is spaced from and parallel to substrate 1202, and liquid crystal material 1206 (e.g., blue phase liquid crystal (BPLC)) disposed between the substrates. Protrusions 1160 and 1170 extend through the pixel area associated with pixel 1200. The protrusions, each of which exhibits a generally rectangular cross-section, are supported by substrate 1202, with each extending upwardly from a base (1162 and 1172, respectively).

Each of the protrusions 1160, 1170 is associated with a first pixel electrode, a first common electrode, a second pixel electrode and a second common electrode. Specifically, protrusion 1160 is associated with first pixel electrode 1164, first common electrode 1165, second pixel electrode 1166 and second common electrode 1167; protrusion 1170 is associated with first pixel electrode 1174, first common electrode 1175, second pixel electrode 1176 and second common electrode 1177. In this embodiment, the first pixel electrodes 1164, 1174 and the first common electrodes 1165, 1175 are positioned adjacent the respective bases (1162, 1172) of the corresponding protrusions. As such, each protrusion is positioned between one of the first pixel electrodes and one of the first common electrodes. For example, the protrusion 1160 is positioned between the first pixel electrode 1164 and the first common electrode 1165.

The second pixel electrodes 1166, 1176 and second common electrodes 1167, 1177 are positioned on their respective protrusions. As shown in FIG. 16, second pixel electrode 1166 and second common electrode 1167 are positioned on an upper portion 1168 (i.e., an upper half) of protrusion 1160 and, thus, are spaced from substrate 1202 by at least one-half the height of protrusion 1160. In this embodiment, both second pixel electrode 1166 and second common electrode 1167 are positioned on a top surface 1169 of protrusion 1160 that is parallel to substrate 1202. A similar configuration is shown with respect to protrusion 1170 and the associated electrodes 1174, 1175, 1176 and 1177. The aforementioned configuration provides an alternating series of first pixel electrode-first common electrode pairs (e.g., pair 1165, 1174) and second pixel electrode-second common electrode pairs (e.g., pair 1166, 1167, and pair 1176, 1177).

It should be noted that various aspects described above may be used on substrates that lack protrusions (i.e., height variations of less than approximately 0.5 μm).

The embodiments described above are illustrative of the invention and it will be appreciated that various permutations of these embodiments may be implemented consistent with the scope and spirit of the invention.

What is claimed is:

1. A liquid crystal display system comprising:
a first substrate;
a second substrate spaced from the first substrate;
liquid crystal material disposed between the first substrate and the second substrate;
a plurality of protrusions supported by the first substrate and arranged in an array, each of the plurality of protrusions extending upwardly from a corresponding base to a corresponding top surface;
a plurality of first pixel electrodes, with a corresponding one of the first pixel electrodes being positioned adjacent the base of a corresponding one of the protrusions;
a plurality of first common electrodes, with a corresponding one of the first common electrodes being positioned adjacent the base of a corresponding one of the protrusions such that each of the plurality of protrusions is positioned between one of the first pixel electrodes and one of the first common electrodes;
a plurality of second pixel electrodes, with a corresponding one of the second pixel electrodes being positioned on the top surface of a corresponding one of the protrusions; and
a plurality of second common electrodes, with a corresponding one of the second common electrodes being positioned on the top surface of a corresponding one of the protrusions;
wherein each of the plurality of protrusions has a corresponding one of the first pixel electrodes and a corresponding one of the first common electrodes positioned adjacent thereto, and a corresponding one of the second pixel electrodes and a corresponding one of the second common electrodes positioned on the top surface thereof;
wherein a first one of the first common electrodes, a first one of the second common electrodes, a first one of the first pixel electrodes, and a first one of the second pixel electrodes are associated with a first one of the protrusions; and
wherein the first one of the second pixel electrodes is positioned along a substrate-extending direction and between the first one of the first pixel electrodes and the first one of the second common electrodes.

2. The liquid crystal display system of claim 1, wherein each of the plurality of protrusions has one of the second pixel electrodes and one of the second common electrodes positioned between one of the first pixel electrodes and one of the first common electrodes.

3. The liquid crystal display system of claim 1, wherein the second pixel electrodes are positioned adjacent corresponding ones of the first pixel electrodes and the second common electrodes are positioned adjacent corresponding ones of the first common electrodes.

4. The liquid crystal display system of claim 1, wherein each of the plurality of protrusions exhibits a base wider than the corresponding upper surface.

5. The liquid crystal display system of claim 1, wherein each of the plurality of protrusions has a necked intermediate portion.

6. The liquid crystal display system of claim 1, wherein:
the array comprises an alternating series of first pixel electrode-first common electrode pairs and second pixel electrode-second common electrode pairs;
each of the plurality of first pixel electrode-first common electrode pairs being operative to exhibit a first electric field; and
each of the plurality of second pixel electrode-second common electrode pairs being operative to exhibit a second electric field.

7. The liquid crystal display system of claim 6, wherein the first electric fields exhibit electric field strengths equal to electric field strengths exhibited by the second electric fields.

8. The liquid crystal display system of claim 6, wherein the first electric fields exhibit electric field strengths greater than electric field strengths exhibited by the second electric fields.

9. The liquid crystal display system of claim 6, wherein the first electric fields exhibit electric field strengths less than electric field strengths exhibited by the second electric fields.

10. The liquid crystal display system of claim 6, wherein:
each of the plurality of second pixel electrode-second common electrode pairs is located on an upper portion of a corresponding one of the protrusions; and
each of the plurality of first pixel electrode-first common electrode pairs is located between a corresponding pair of adjacent protrusions.

11. The liquid crystal display system of claim 6, wherein the array is operative to exhibit a plurality of third electric fields, with each of the plurality of third electric fields spanning above a corresponding one of the first electric fields.

12. The liquid crystal display system of claim 11, wherein each of the plurality of third electric fields is associated with the second common electrode from one of a corresponding pair of adjacent protrusions and the second pixel electrode from another of the corresponding pair of adjacent protrusions.

13. The liquid crystal display system of claim 1, further comprising a plurality of first data lines and a plurality of second data lines, each of the plurality of first data lines electrically communicating with the first pixel electrode and each of plurality of the second data lines electrically communicating with the second pixel electrode of a corresponding one of the protrusions.

14. The liquid crystal display system of claim 13, further comprising a plurality of first common lines and a plurality of second common lines, each of the plurality of first common lines electrically communicating with the first common electrode and each of the plurality of second common lines electrically communicating with the second common electrode of a corresponding one of the protrusions.

15. The liquid crystal display system of claim 1, a voltage difference between each of the plurality of second pixel electrodes and its corresponding one of the second common electrode is higher than a voltage difference between each of the plurality of the first pixel electrode and its corresponding one of the first common electrode.

16. The liquid crystal display system of claim 1, wherein each of the plurality of first pixel electrodes comprises an electrode portion and a extended portion, the electrode portion is positioned on and contacts the substrate, the extended portion is extended from the electrode portion and positioned on the sidewall of corresponding one of the protrusions.

17. The liquid crystal display system of claim 1, wherein a ratio (p) of voltage exhibited by one of the first pixel electrodes and an adjacent one of the second pixel electrodes is expressed by $0.01<p<1$.

18. The liquid crystal display system of claim 1, wherein the first one of the second common electrodes is positioned along the substrate-extending direction and between the first one of the second pixel electrodes and the first one of the first common electrodes.

19. A liquid crystal display system comprising:
a first substrate;
a second substrate spaced from the first substrate;
liquid crystal material disposed between the first substrate and the second substrate;
a plurality of protrusions supported by the first substrate and arranged in an array, each of the plurality of protrusions extending upwardly from a corresponding base to a corresponding top surface;
a plurality of first pixel electrodes, with a corresponding one of the first pixel electrodes being positioned adjacent the base of a corresponding one of the protrusions;
a plurality of first common electrodes, with a corresponding one of the first common electrodes being positioned adjacent the base of a corresponding one of the protrusions such that each of the plurality of protrusions is positioned between one of the first pixel electrodes and one of the first common electrodes;
a plurality of second pixel electrodes, with a corresponding one of the second pixel electrodes being positioned on the top surface of a corresponding one of the protrusions;
a plurality of second common electrodes, with a corresponding one of the second common electrodes being positioned on the top surface of a corresponding one of the protrusions;
a plurality of first data lines and a plurality of second data lines, each of the plurality of first data lines electrically communicating with the first pixel electrode and each of plurality of the second data lines electrically communicating with the second pixel electrode of a corresponding one of the protrusions; and
a plurality of first common lines and a plurality of second common lines, each of the plurality of first common lines electrically communicating with the first common electrode and each of the plurality of second common lines electrically communicating with the second common electrode of a corresponding one of the protrusions;
wherein each of the plurality of protrusions has a corresponding one of the first pixel electrodes and a corresponding one of the first common electrodes positioned adjacent thereto, and a corresponding one of the second pixel electrodes and a corresponding one of the second common electrodes positioned on the top surface thereof.

* * * * *